(12) United States Patent
Kamiyama et al.

(10) Patent No.: US 8,568,060 B2
(45) Date of Patent: Oct. 29, 2013

(54) REHABILITATING PIPE SEGMENT AND EXISTING PIPE REHABILITATION METHOD USING SAME

(75) Inventors: Takao Kamiyama, Hiratsuka (JP); Koji Kaneta, Hiratsuka (JP); Kenji Fujii, Hiratsuka (JP); Katsuyori Miura, Hiratsuka (JP)

(73) Assignee: Shonan Gosie-Jushi Seisakusho K.K. (JP)

( * ) Notice: Subject to any disclaimer, the term of this patent is extended or adjusted under 35 U.S.C. 154(b) by 311 days.

(21) Appl. No.: 12/460,228

(22) Filed: Jul. 15, 2009

(65) Prior Publication Data

US 2010/0012213 A1     Jan. 21, 2010

(30) Foreign Application Priority Data

Jul. 17, 2008    (JP) .................................. 2008-185477
Jun. 2, 2009    (JP) .................................. 2009-133005

(51) Int. Cl.
*F16L 55/18*     (2006.01)

(52) U.S. Cl.
USPC .................. 405/184.1; 405/184.2; 405/150.1; 138/98

(58) Field of Classification Search
USPC ........... 405/134, 135, 150.1, 151, 153, 184.1, 405/184.2, 184.5; 285/223, 235, 236; 138/98, 155, 120
See application file for complete search history.

(56) References Cited

U.S. PATENT DOCUMENTS 4,151,865 A * 5/1979 Lehrer .......................... 138/120
2005/0252565 A1 * 11/2005 Kamiyama et al. ............. 138/98

* cited by examiner

*Primary Examiner* — Sean Andrish
(74) *Attorney, Agent, or Firm* — Adams & Wilks

(57) ABSTRACT

A rehabilitating pipe segment for assembling a rehabilitating pipe inside an existing pipe. The rehabilitating pipe segment has first and second segment halves connectable together to provide for the rehabilitating pipe segment an internal surface plate and side and end plates surrounding peripheral edges of the internal surface plate. The first and second segment halves are configured to move relative to one another in a width direction of the rehabilitating pipe segment corresponding to a pipe length direction of the rehabilitating pipe so that the first and second pipe segment halves expand and contract to make the width of the rehabilitating pipe segment variable in the width direction of the rehabilitating pipe segment.

12 Claims, 18 Drawing Sheets

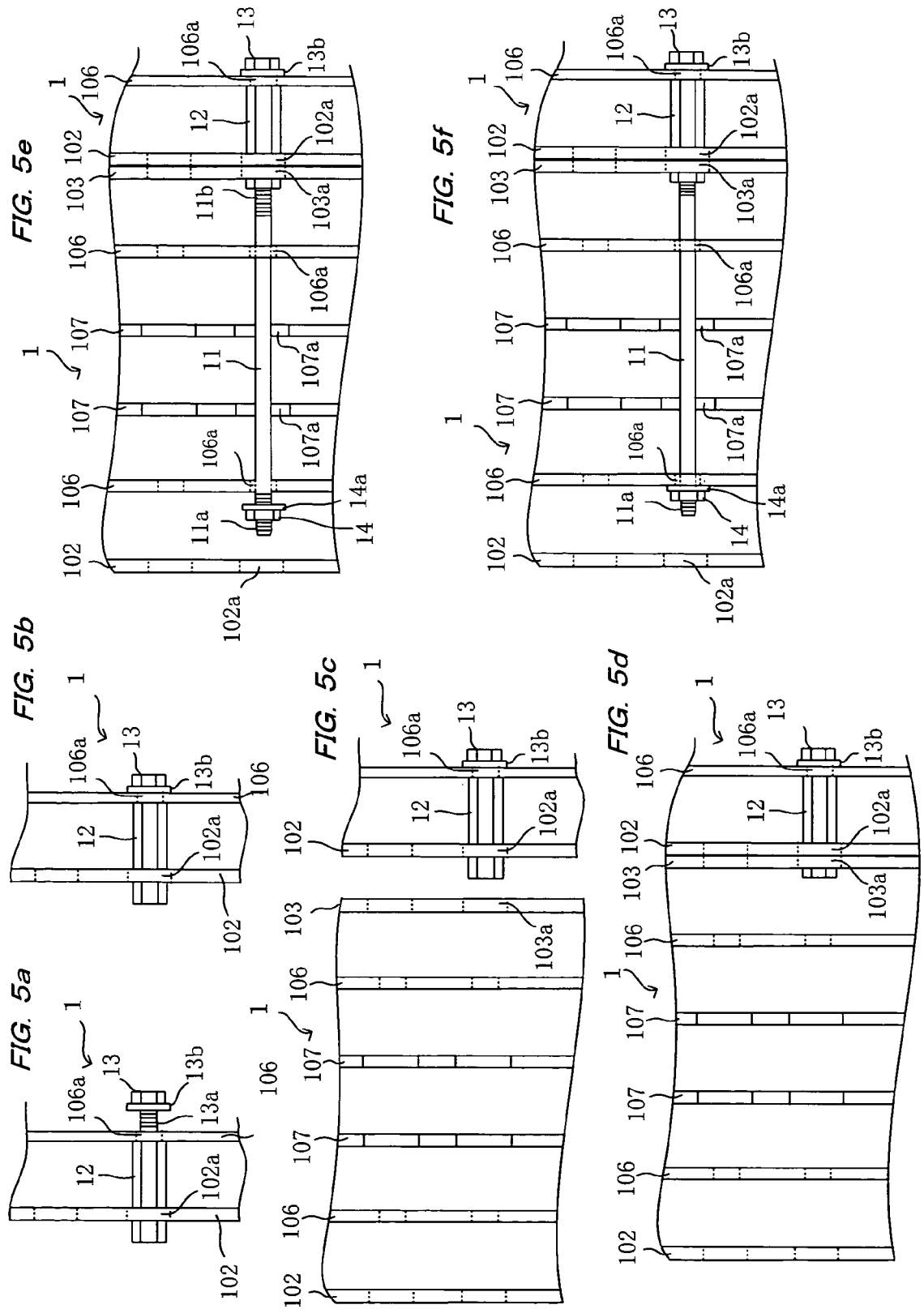

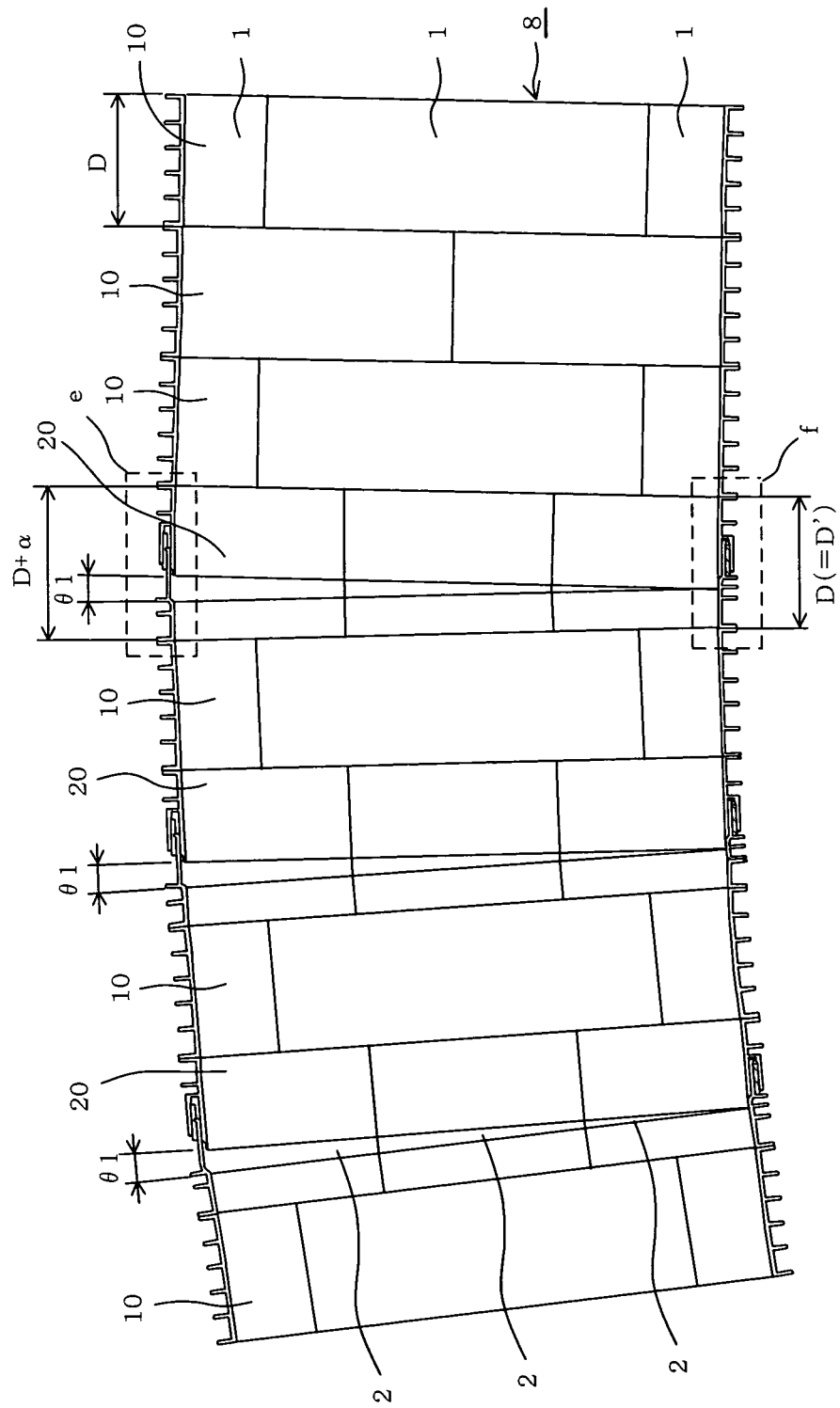

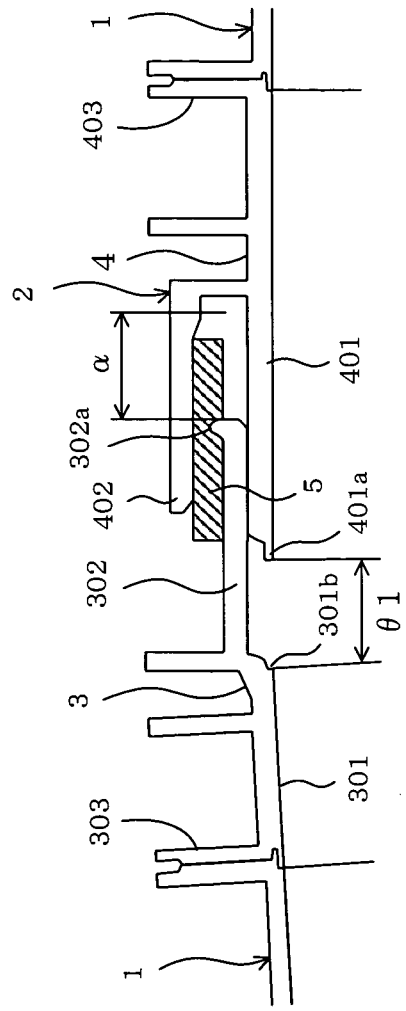
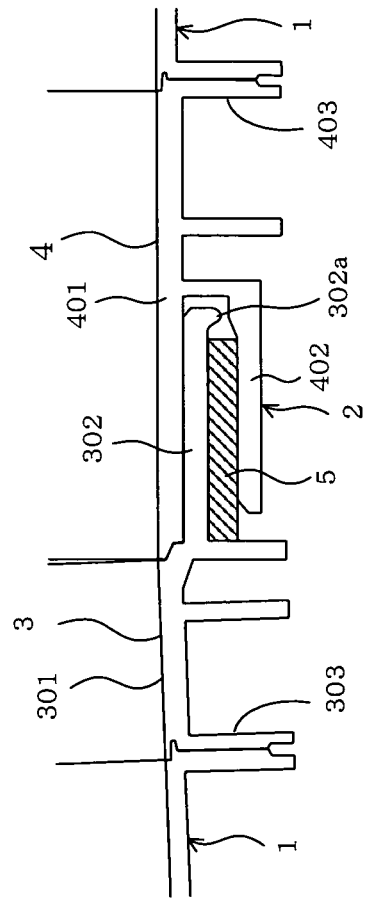
FIG. 14a
FIG. 14b

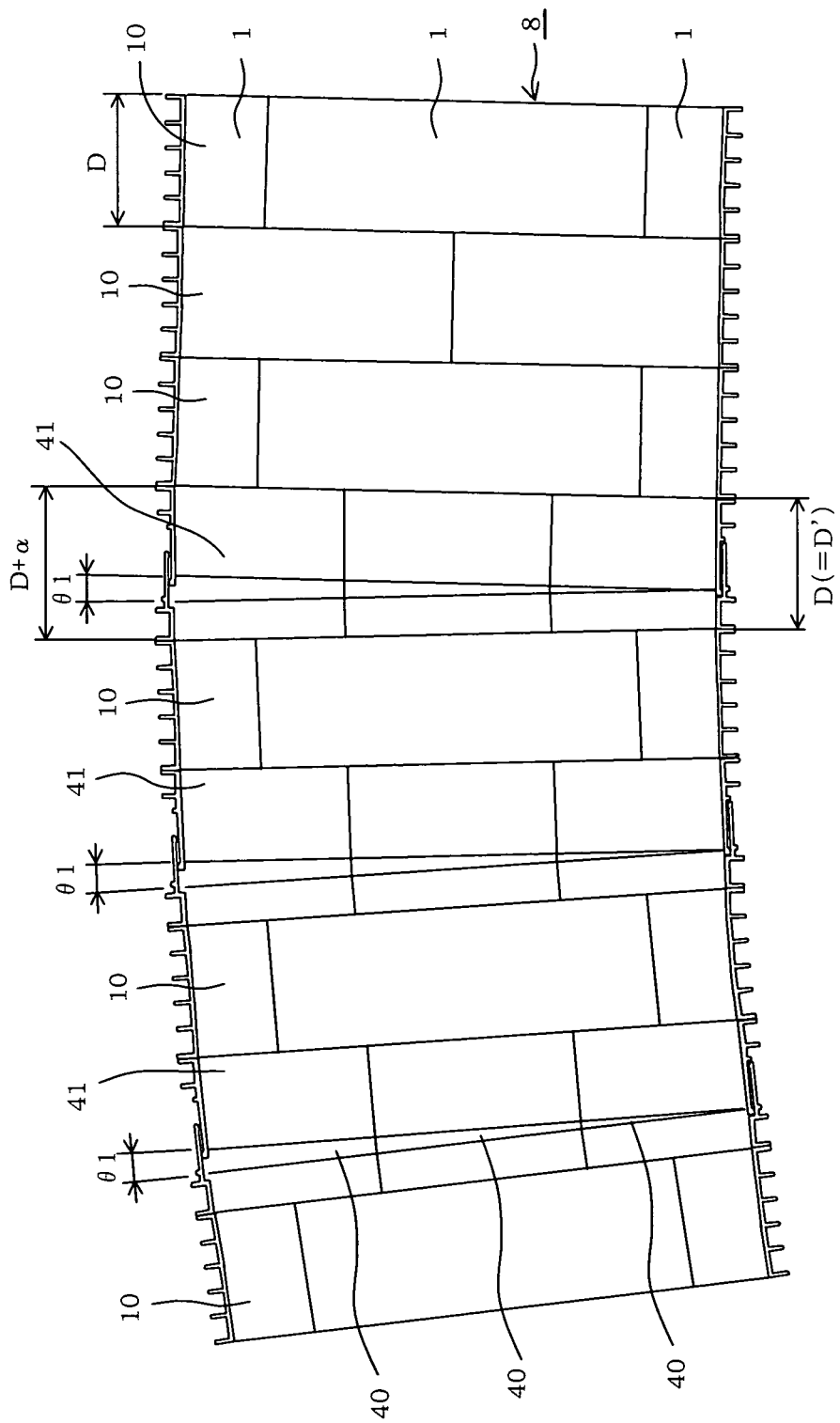

REHABILITATING PIPE SEGMENT AND EXISTING PIPE REHABILITATION METHOD USING SAME

BACKGROUND OF THE INVENTION

1. Field of the Invention

The present invention relates to a rehabilitating pipe segment adapted for use to rehabilitate existing pipes by linking a plurality of segments in the circumferential direction and pipe length direction, and to a rehabilitation method using this segment to rehabilitate existing pipes.

2. Description of the Related Art

There are pipe rehabilitation methods known in the art for linking a plurality of segments in the circumferential direction and pipe length direction to assemble a rehabilitating pipe when sewerage pipes, waterworks pipes, agricultural water pipes, and other existing pipes have aged. A filler is used to fill the space between the rehabilitating pipe and existing pipe so as to integrate both the pipes together and construct a composite pipe (JP-A-2003-286742 and JP-A-2005-299711).

The rehabilitating pipe segment is an assembly unit for a rehabilitating pipe and comprises an internal surface plate, side plates, and end plates, these plates being integrally molded from a transparent or nontransparent plastic material in the form of a block. Reinforcing plates and ribs are preferably provided to increase the strength of the segment.

The existing pipe described above is formed by connecting a plurality of pipes of a specified length, and the seams in the existing pipe therefore occasionally separate when an earthquake or some other great force acts on the exterior. In cases in which the existing pipe has been rehabilitated using the segments described above, the seam portions or portions in the vicinities of the seams will rupture under the tension in the rehabilitating pipe integrated with the existing pipe. This is because the width dimension of the segment constituting the rehabilitating pipe is fixed and cannot be expanded or contracted by tension. In the case that the existing pipe is a sewerage pipe, external liquefied sediment flows in through ruptured portions of the sewerage pipe between separated seams of the sewerage pipe, compromising the function of the sewerage pipe.

When a curved existing pipe is being rehabilitated, the segment requires special machining as well, such as cutting the segment at a slant in relation to the curve, and there have been problems in that the curved rehabilitating pipe cannot be assembled in a simple manner.

SUMMARY OF THE INVENTION

It is therefore an object of the present invention to provide a rehabilitating pipe segment that makes it possible both to construct a composite pipe that suffers no functional loss even when a large impact acts externally and to rehabilitate even a curved existing pipe in a simple manner; and also to provide an existing pipe rehabilitation method using this segment.

The present invention provides a rehabilitating pipe segment adapted for use to assemble a rehabilitating pipe inside an existing pipe, the rehabilitating pipe having a smaller outside diameter than the inside diameter of the existing pipe. The rehabilitating pipe segment is composed of a first segment half and a second segment half, which are capable of moving relative to each other in the pipe length direction to make the width of the segment of the first and second segment halves variable in the pipe length direction.

In the segment of the present invention, the pipe-length-direction width of the segment composed of the first and second segment halves increases when tension of a predetermined value or greater is applied in the width direction corresponding to the pipe length direction of the rehabilitating pipe.

The first segment half has an internal surface plate constituting the internal peripheral surface of the segment, a convex plate extending parallel to the internal surface plate, and a side plate extending perpendicular to the internal surface plate and constituting one side plate of the segment. The second segment half has an internal surface plate constituting the internal peripheral surface of the segment, an internal plate for forming a concavity, the internal plate extending parallel to the internal surface plate, and the other side plate of the segment extending perpendicular to the internal surface plate. The convex plate of the first segment half and a braking member for braking the first and second segment halves from separating are fitted into the concavity of the second segment half so as to link the first and second segment halves together.

In the present invention, a rehabilitating pipe segment that does not use the braking member is also proposed.

A rehabilitation method for rehabilitating an existing pipe comprises the steps of linking first and second segment halves together to provide a variable-width segment whose width in the pipe length direction is variable; linking the variable-width segments together in the circumferential direction to provide a first pipe unit; linking fixed-width segments together in the circumferential direction to provide a second pipe unit; and linking the first and second pipe units together in the pipe length direction so as to assemble a rehabilitating pipe inside an existing pipe.

The first pipe units are preferably disposed at the seam portions of the existing pipe or in the vicinities thereof.

Alternatively, the first pipe units are disposed at the curved portions of the existing pipe, and the widths of the variable-width segments constituting the first pipe units increase progressively from one end to the other end in the circumferential direction so as to be at a minimum in the internal periphery of the curved portions and a maximum in the external periphery of the curved portions.

The width dimensions in the rehabilitating pipe segment of the present invention increase when tension of a specific value or greater acts in the width direction corresponding to the pipe length direction of the rehabilitating pipe. This allows pipe earthquake resistance to be improved when a rehabilitating pipe is assembled using the rehabilitating pipe segment of the present invention. A curved rehabilitating pipe can also be assembled in a simple manner using the rehabilitating pipe segment of the present invention.

Specifically, if an earthquake or some other severe external shock occurs and tension acts on the pipe so as to separate the seams of the existing pipe, width varies accordingly in the rehabilitating pipe segments disposed at the seams, thereby preventing the rehabilitating pipe from rupturing.

The width in the pipe length direction can be varied in the rehabilitating pipe segment of the present invention. Therefore, the rehabilitating pipe can be curved merely by adjusting the width of the segment, requiring no special machining of the segment. This enables a curved rehabilitating pipe to be assembled in a simple manner and in a short amount of time. Increases in the width of the rehabilitating pipe segment also prevent ruptures in the rehabilitating pipe even if tension acts in the increased width portions.

Further features of the invention, its nature and various advantages will be more apparent from the accompanying drawings and following detailed description of the invention.

BRIEF DESCRIPTION OF THE DRAWINGS

FIGS. 5a through 5f are illustrative views showing a method for linking segments together in the pipe length direction;

FIG. 13 is a cross-sectional view of a rehabilitating pipe when a curved rehabilitating pipe is assembled using variable-width segments;

FIGS. 14a and 14b are enlarged views of areas e and f, respectively, in FIG. 13;

FIG. 17 is a cross-sectional view of a rehabilitating pipe when a curved rehabilitating pipe is assembled using the variable-width segment in FIG. 16.

DETAILED DESCRIPTION OF THE PREFERRED EMBODIMENTS

Embodiments of the present invention are described in detail hereinafter with reference to the attached drawings. The rehabilitating pipe segment of the present invention is used as a segment for rehabilitating a sewerage pipe, a waterworks pipe, an agricultural water pipe, or some other existing pipe, and an existing pipe is rehabilitated using this rehabilitating pipe segment.

Figure 1:
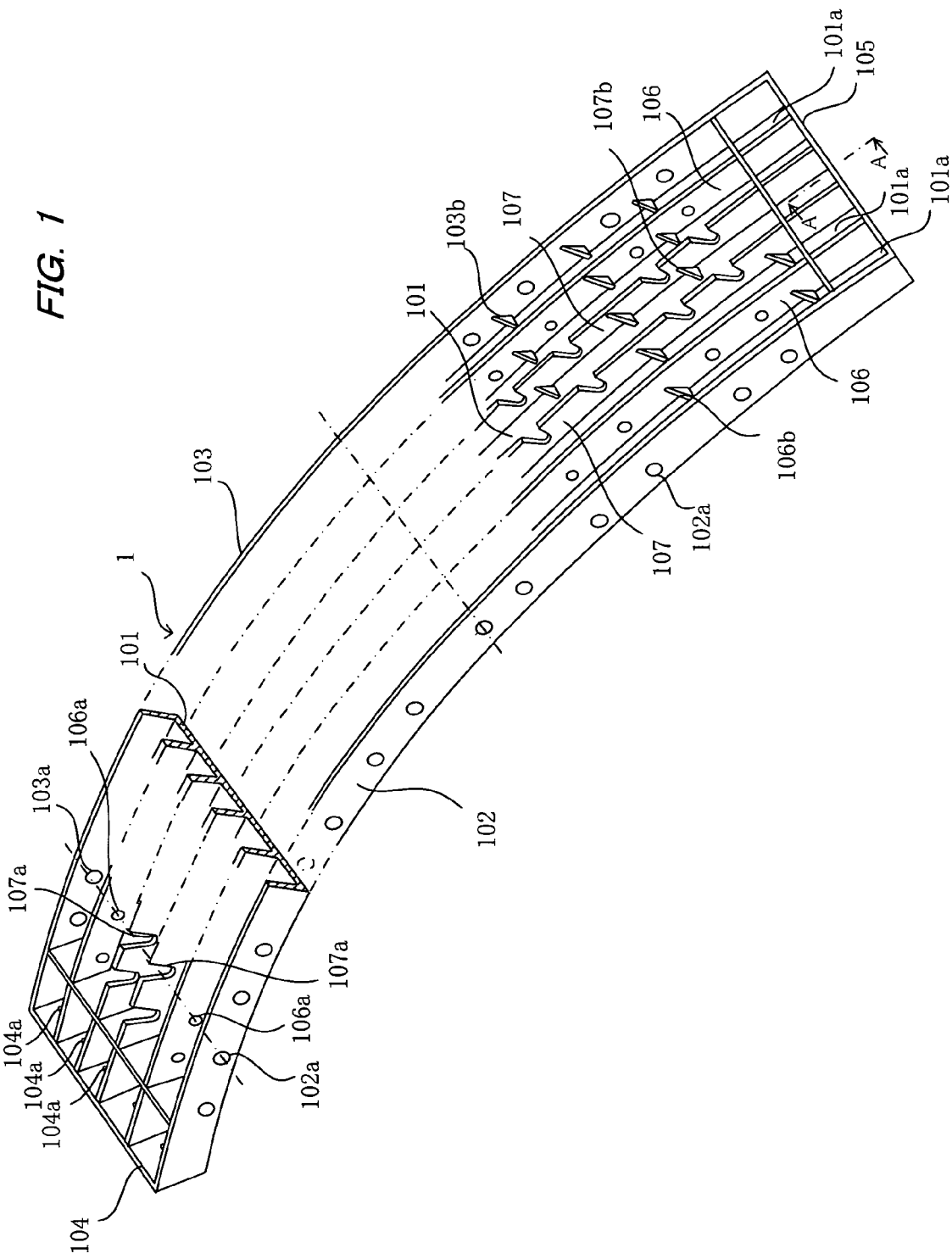
FIG. 1 is a perspective view showing the structure of a fixed-width segment used to assemble a rehabilitating pipe.

FIG. 1 shows the structure of a rehabilitating pipe segment 1 (hereinafter referred to simply as a segment), which is used as an assembly unit of a rehabilitating pipe for rehabilitating an existing pipe. The segment 1 is in the form of an arcuate segment structure configured as an integrally molded block-shaped member made of a plastic material and composed of an internal surface plate 101 constituting the internal peripheral surface of the rehabilitating pipe, side plates 102, 103 erected vertically at both sides extending in the circumferential direction of the internal surface plate 101, and end plates 104, 105 erected vertically at both ends extending in the pipe length direction of the internal surface plate 101. The side plates 102, 103 and end plates 104, 105 are on four sides at the same height and constitute outer wall plates surrounding the peripheral edges of the internal surface plate 101. In the present embodiment, the segment 1 has a shape curved into an arc obtained by dividing the circumference into, e.g., five equal parts at predetermined angles (72°). The segment is not limited to an arc or fan shape, and can also be a rectangular parallelepiped, a curved shape made by providing roundness to right angles, or another shape in accordance with the cross-sectional shape of the existing pipe, the size thereof, or the maintenance locations of the existing pipe.

In cases of reinforcing the mechanical strength of the segment 1, a plurality of internal plates 106, 107 similar to the side plates 102, 103 are erected on the top surface of the internal surface plate 101 inside of the side plates 102, 103. On the inside surfaces of the side plates 102, 103 and on both side surfaces of the internal plates 106, 107 are formed convex plates 103b, 106b, 107b projecting to the sides at a plurality of locations in order to prevent deformation, creating a rib structure and increasing the strength of the segment 1.

The internal surface plate 101, the side plates 102, 103, the end plates 104, 105, the internal plates 106, 107, and the convex plates 103b, 106b, 107b are all made of the same transparent, semitransparent, or nontransparent plastic material, and are integrally molded using a conventional molding technique.

A plurality of openings 101a for linking segments 1 in the circumferential direction are formed at both ends of the internal surface plate 101, and in order to link the segments 1 in the pipe length direction, a plurality of holes 102a, 103a, and 106a are formed in the side plates 102, 103 and internal plate 106, and a plurality of grooves 107a are formed in the internal plates 107.

Figure 2:
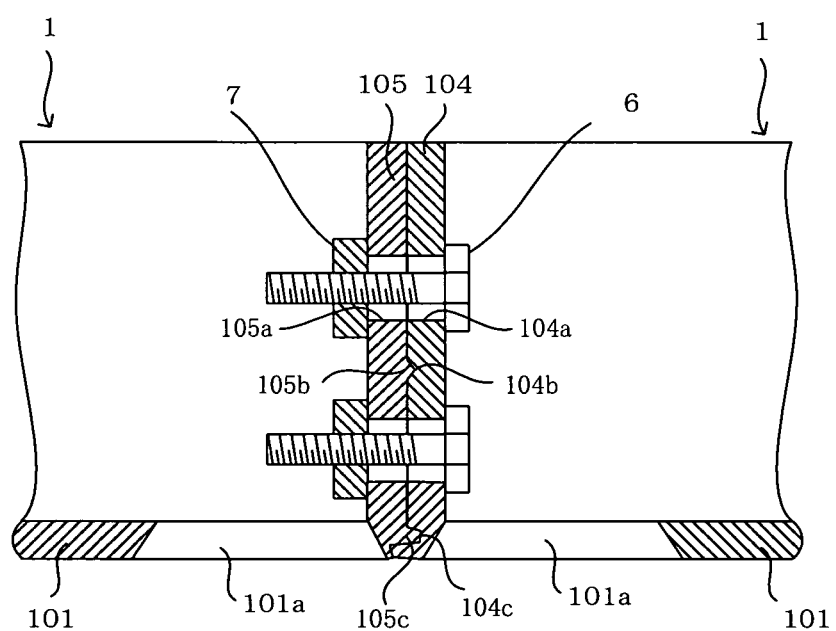
FIG. 2 is a cross-sectional view along the line A-A in FIG. 1, showing the structure of two segments linked together in the circumferential direction.

Bolts 6 are inserted into insertion holes 104a, 105a from the openings 110a of the segments 1, and nuts 7 are threaded over the bolts 6 in order to fasten the end plates 104, 105 together and link the segments 1 in the circumferential direction, as shown in FIG. 2. Concavities 104b, 104c are formed across the entire lengths of the end plates 104 in the pipe length direction, and convexities 105b, 105c which fit into the concavities are similarly formed in the end plates 105. Therefore, the operation of positioning and firmly connecting the segments 1 when linking them together is made easier. The watertightness of the linked portions can be increased by coating the fitted portions with a seal material (not shown). After the segments are finished being linked, the openings 110a are closed using lids (not shown) or other means. The internal surfaces of the lids at this time are continuous with the internal surfaces of each internal surface plate 101 so as to form an even internal surface. In cases in which it is easy to link the segments in the circumferential direction by the bolts 6 and nuts 7, there is no particular need for the openings 110a.

Two sets of bolts and nuts are used in FIG. 2, but in the case of segments used for small-diameter existing pipes, the segments can be linked in the circumferential direction by only one set of a bolt and nut.

Figure 3:
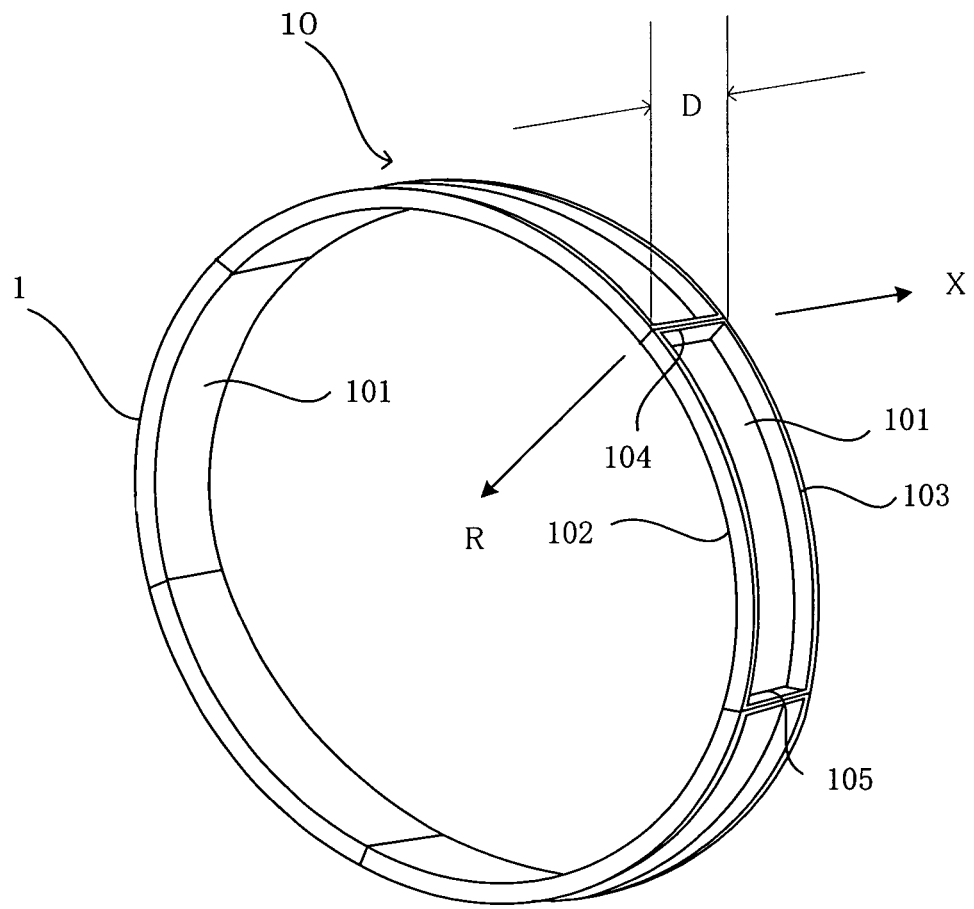
FIG. 3 is a perspective view showing a state in which segments have been linked together in the circumferential direction so as to assemble a pipe unit.

When segments 1 are linked sequentially in the circumferential direction to complete a full circle, a closed ring-shaped short pipe 10 (hereinafter referred to as a pipe unit) of a predetermined short length can be assembled, such as is shown in FIG. 3. The pipe unit 10 has a shape obtained when a circular pipe is cut into rings of a predetermined width D perpendicular to the pipe length direction X, and the outside diameter thereof is a value slightly less than the inside diameter of the existing pipe to be rehabilitated. The segments 1 correspond to members obtained when the pipe unit 10 is cut in the diametral direction R and divided (preferably equally divided) into a plurality of units in the circumferential direction.

The internal surface plates 101, side plates 102, 103, and end plates 104, 105 are shown in FIG. 3 as primary structural members of the segments 1, and the internal plates 106, 107, convex plates, and other reinforcing structures are not shown for the sake of avoiding complexity. In this Specification, the term "pipe length direction" refers to the direction indicated by the arrow X extending in the pipe length direction of the pipe unit 10 in FIG. 3, the term "diametral direction" refers to the radial direction indicated by the arrow R pointing toward the center axis of the pipe unit 10, and the term "circumferential direction" refers to the circumferential direction of the circle formed by the pipe unit 10.

When rehabilitating an existing pipe, first, a plurality of segments 1 are linked in the circumferential direction inside the existing pipe as described above so as to assemble the pipe unit 10, and the segments of the pipe unit 10 are linked in the pipe length direction so as to assemble a rehabilitating pipe.

Figure 4:
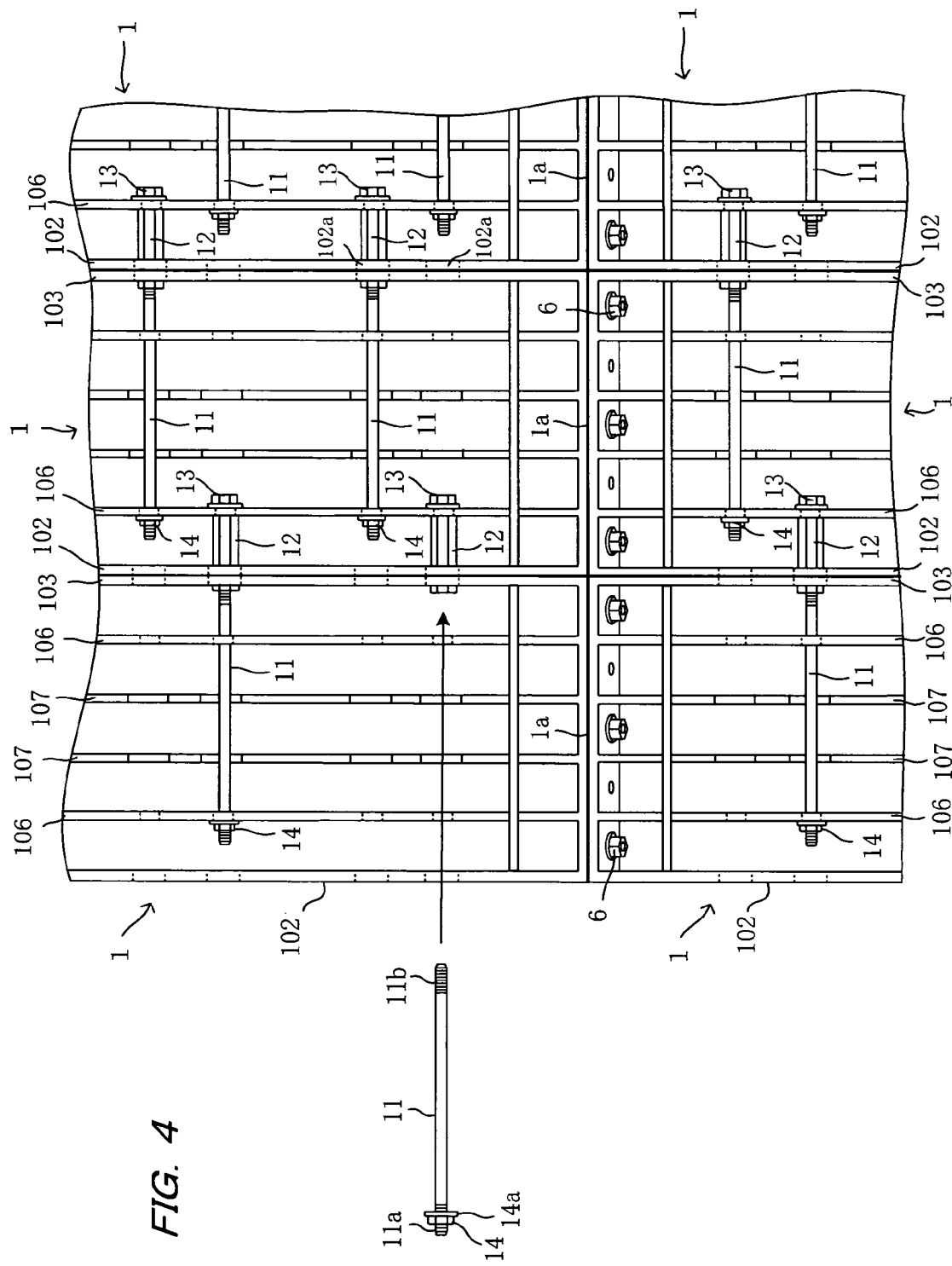
FIG. 4 is a segment top view showing a state in which segments have been linked together in the pipe length direction.

FIGS. 4 and 5 show segments as being linked in the pipe length direction using nuts 12 and rod-shaped screw members 11 having screws 11a, 11b formed at both ends. The nuts 12 are shaped so as to be capable of passing through the holes 102a, 103a in the side plates 102, 103 of the segments 1, but not through the holes 106a in the internal plates 106. Flanges 14a of nuts 14 threaded over the screws 11a of the screw members 11 are sized so as to be capable of passing through the holes 102a in the side plates 102 of the segments 1, but not through the holes 106a in the internal plates 106. Flanges 13b of bolts 13 threaded over the nuts 12 have larger diameters than the holes 106a in the internal plates 106, and the diameters of the screw members 11 are smaller than the diameters of the holes 106a in the internal plates 106.

A nut 12 is passed through a hole 102a in a side plate 102 of one segment 1 and brought in contact with the internal plate 106, and the bolt 13 is screwed into the nut 12 as shown in FIG. 5a. The nut 12 is then fastened to the internal plate 106 so as to be fixed to the segment 1 as shown in FIG. 5b. The nuts 12 may be fixed to the segments 1 after the segments 1 are linked in the circumferential direction as shown in FIG. 3, or the segments may be linked in the circumferential direction so as to constitute the pipe unit 10 after the nuts 12 are first fixed to the segments 1.

A nut 12 is passed through a hole 103a in a side plate 103 of another segment 1 as shown in FIGS. 5c and 5d in order to bring the two segments 1 together. In this state, the screw member 11 is passed through the hole 102a in the side plate 102 of the segment 1, the holes 106a in the internal plates 106, and the grooves 107a in the internal plates 107 as shown in FIGS. 4 and 5e, and the screw 11b is threaded through the nut 12 fixed to one segment 1. The screw member 11 and the nut 12 are thereby linked together. The nut 14 is then threaded until the flange 14a of the nut 14 is pressed against the internal plate 106 as shown in FIG. 5f. This enables the two segments 1, 1 to be fastened together and fixed in place.

In FIG. 4, the linking of segments in the circumferential direction is accomplished via one set of bolts and nuts, and one bolt 6 is shown in FIG. 4.

Figure 18:
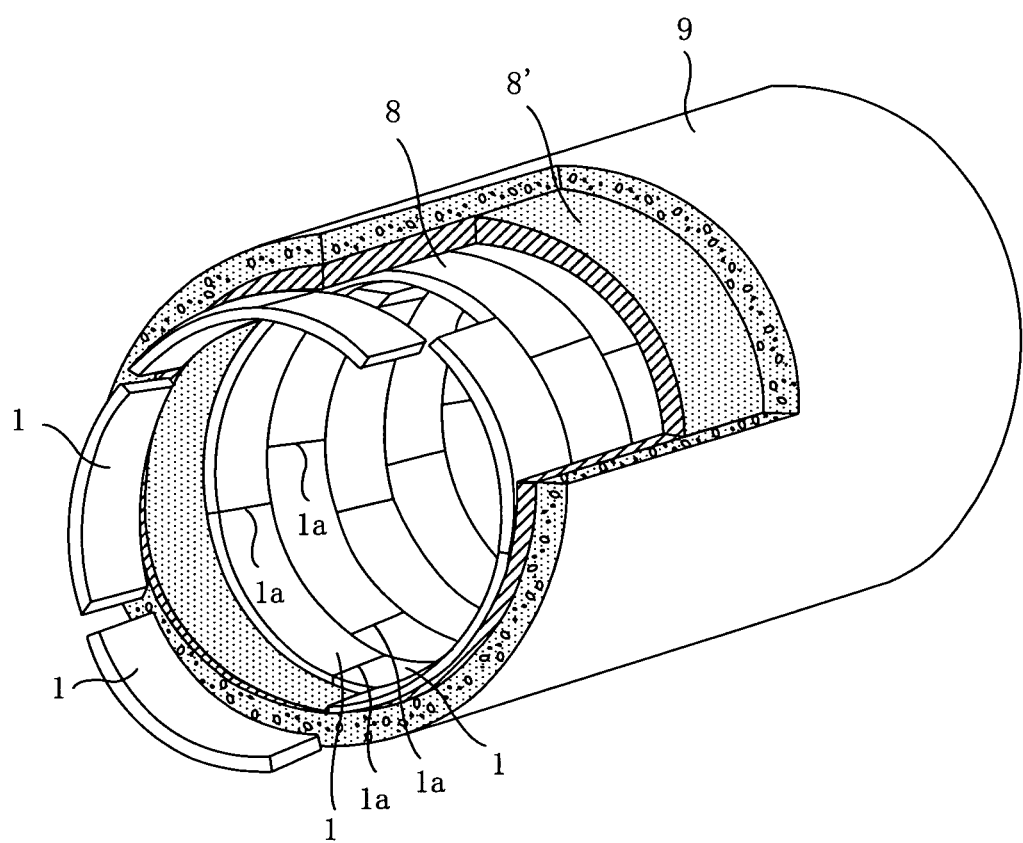
FIG. 18 is a segmented perspective view showing a state in which a rehabilitating pipe is assembled inside an existing pipe using fixed-width segments.

A rehabilitating pipe 8 can be assembled inside an existing pipe 9 as shown in FIG. 18 by linking the segments of the pipe unit in the pipe length direction in the manner described above. Grout or another type of filler 8' is filled in the gap between the existing pipe 9 and the rehabilitating pipe 8 to integrate the existing pipe 9 and rehabilitating pipe 8 and construct a composite pipe.

In FIG. 18, the structures of the segments 1 and their linking in the circumferential direction and pipe length direction would complicate the drawing and are therefore omitted. In FIG. 18, linked portions 1a between segments 1 in the circumferential direction are offset by a predetermined amount in the circumferential direction from linked portions 1a of segments adjacent in the pipe length direction. There is none of such offsets in the example in FIG. 4.

Figure 6A:
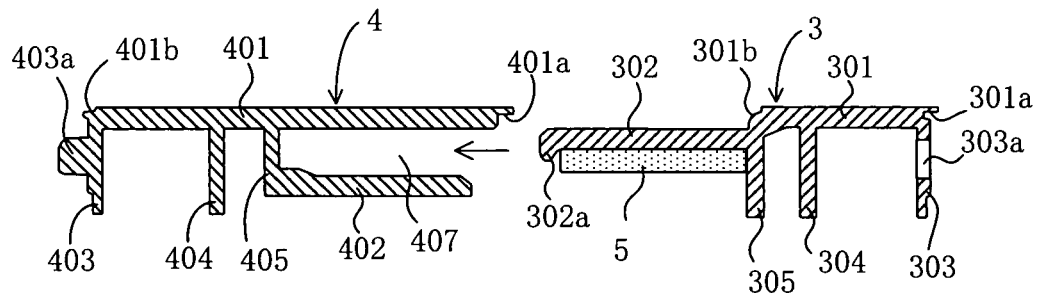
FIGS. 6a through 6c are cross-sectional views showing the structure of a variable-width segment.
Figure 6B:
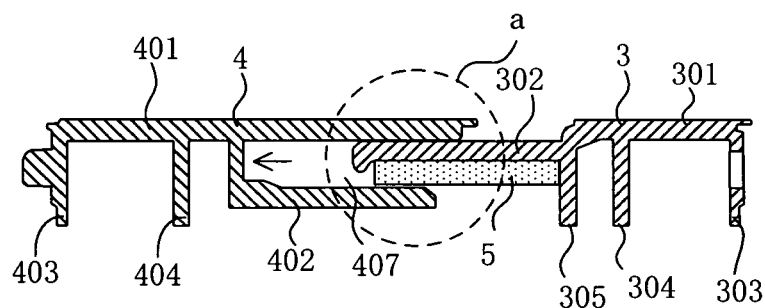
Figure 6C:
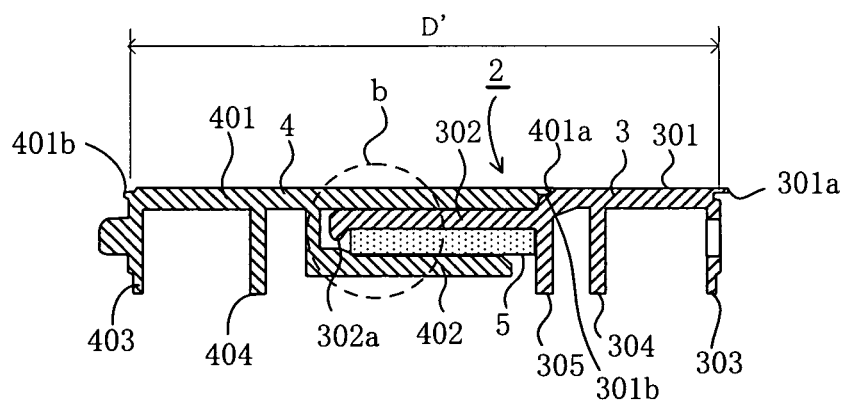
Figure 6D:
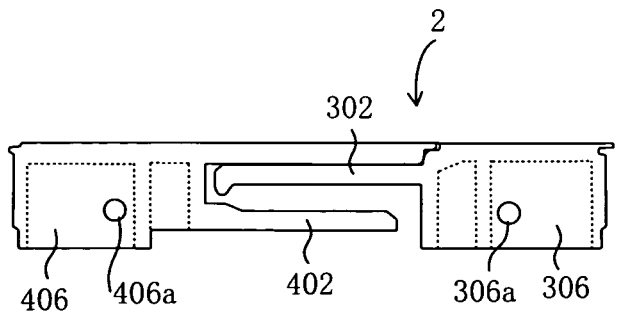
FIG. 6d is an end surface view showing the end surface of the variable-width segment.

In the embodiment as described above, the width (D in FIG. 3) of a segment 1 in the pipe length direction is constant. This means that the segment 1 can be said to be a fixed-width segment. On the other hand, FIG. 6 shows a segment whose width can be varied in the pipe length direction of the segment (hereinafter referred to as a variable-width segment). FIGS. 6a through 6c are cross-sectional views when a variable-width segment is cut in the diametral direction, and FIG. 6d is an end surface view showing an end plate of a variable-width segment.

A variable-width segment 2 is composed of first and second segment halves 3, 4, and a braking rubber 5 is attached as a braking member between the segment halves 3, 4.

The segment half 3 is configured from an internal surface plate 301, a convex plate 302, a side plate 303, internal plates 304, 305, an end plate 306, and other components, wherein the plates 301 to 306 are all integrally molded using the same plastic material as the segment 1. The convex plate 302 extends parallel to and at a different height from the internal surface plate 301. The side plate 303, internal plates 304, 305, and end plate 306 extend perpendicular to the internal surface plate 301.

Recesses 301a, 301b are formed on both sides of the internal surface plate 301, and a ridge 302a is formed on the side of the convex plate 302 facing the segment half 4. A linking hole 303a is formed in the side plate 303.

Figure 12A:
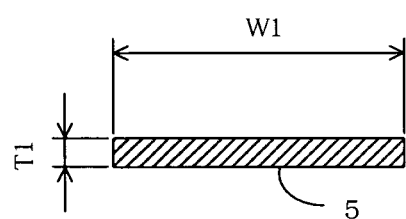
FIG. 12a is a cross-sectional view showing the cross-sectional shape and dimensions of a braking rubber.

The braking rubber 5 has a belt shape of a predetermined width W1 and predetermined thickness T1 as shown in FIG. 12a, and has a length corresponding to the entire circumferential length of the segment half 3. The braking rubber 5 is held between the ridge 302a of the convex plate 302 and the internal plate 305. The braking rubber 5 may also be a belt-shaped braking member composed of plastic or another elastic material other than rubber.

The segment half 4 is configured from an internal surface plate 401, a side plate 403, internal plates 402, 404, 405, an end plate 406, and other components. The plates 401 through 406 are all integrally molded using the same plastic material as the segment 1. The side plate 403, the internal plates 404, 405, and the end plate 406 extend perpendicular to the internal surface plate 401, and the internal plate 402 extends parallel to the internal surface plate 401. A ridge 401a for fitting with the recess 301b of the segment half 3 is formed on the side of the internal surface plate 401 near the segment half 3, and on the opposite side a ridge 401b is formed. In the side plate 403 is formed a protuberance 403a for fitting with the holes 102a, 103a in the side plates 102, 103 of the segment 1, or with the hole 303a in the segment half 3.

Figure 7A:
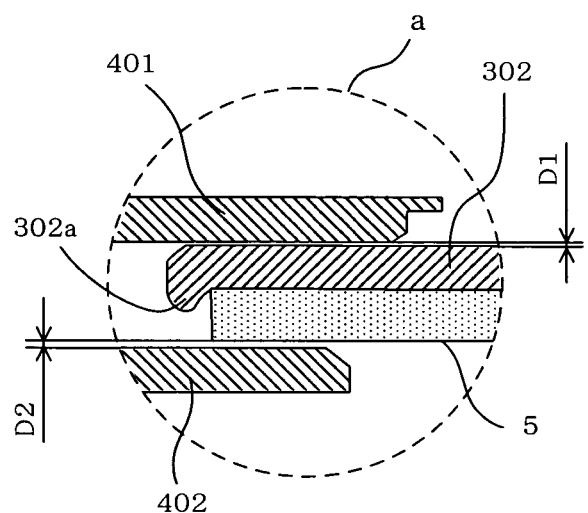
FIGS. 7a and 7b are enlarged views of areas a and b, respectively, in FIG. 6.

A concavity 407 for fitting with the braking rubber 5 and the convex plate 302 of the segment half 3 is formed by the internal plates 402, 405 and the internal surface plate 401. The dimensions of these members are set so that a gap of a small interval D1 is formed between the internal surface plate 401 and the convex plate 302, and a gap of a small interval D2 is also formed between the braking rubber 5 and the internal plate 402, as shown FIG. 7a. These settings make it possible to smoothly insert the braking rubber 5 and the convex plate 302 of the segment half 3 into the concavity 407 of the segment half 4 without applying a load to any of the members, as shown by the arrows in FIGS. 6a and 6b.

Figure 7B:
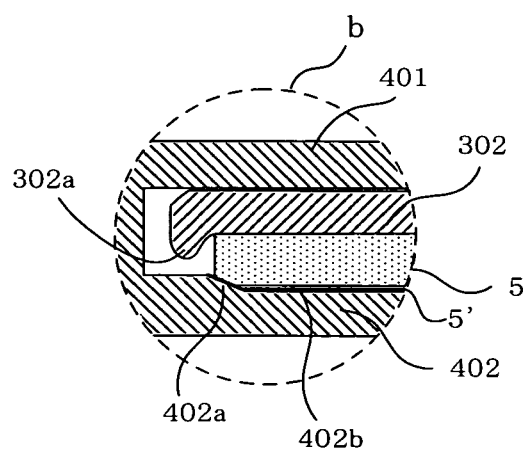

The convex plate 302 and the braking rubber 5 are inserted and fitted deep into the concavity 407 as shown in FIG. 6c. The distal end of the braking rubber 5 comes in contact with an inclined surface 402a of the internal plate 402, as shown in FIG. 7b. When a low-viscosity adhesive 5' is thinly applied in advance over the inclined surface 402a and a level surface 402b of the internal plate 402, the braking rubber 5 can be fixed to the internal plate 402 of the segment half 4. Since the braking rubber 5 is held between the internal plate 305 and the ridge 302a of the convex plate 302, the braking rubber 5 and the segment half 3 do not move relative to each other and the segment halves 3, 4 remain integrally coupled via the braking rubber 5 in the state shown in FIG. 6c, as long as no strong force is applied. At this time, the ridge 401a of the internal surface plate 401 and the recess 301b of the internal surface plate 301 are fitted together, and the internal surface plate 301 of the segment half 3 and the internal surface plate 401 of the segment half 4 constitute an even surface wherein the top surface in FIG. 6 has no height differences.

The variable-width segment 2 in the state shown in FIGS. 6c and 6d has the same shape and structure as the fixed-width segment 1 such as is shown in FIG. 1. The internal surface plates 301 and 401 of the variable-width segment 2 correspond to the internal surface plate 101 of the fixed-width segment 1 and constitute an even internal surface when the rehabilitating pipe has been assembled. The side plates 303, 403 of the variable-width segment 2 correspond to the side plates 102, 103 of the fixed-width segment 1, and the internal plates 304, 404 correspond to the internal plates 106 and reinforce the strength of the variable-width segment 2. A plurality of holes 303a of the side plate 303 and protuberances 403a of the side plate 403 are provided according to the number of holes 102a, 103a formed in the side plates 102, 103 of the segment 1.

The width D' of the variable-width segment 2 in the pipe length direction is the same as the width D (FIG. 3) of the fixed-width segment 1, and the arcuate shape of the variable-width segment 2 is an arcuate shape of 72º divided circumferentially into five equal parts, as is the arcuate shape of the fixed-width segment 1. Therefore, the shapes of the side plates 303, 403 of the variable-width segment 2 coincide with those of the side plates 102, 103 of the fixed-width segment 1, and all of the plates 301, 302, 304, 305, 401, 402, 404, 405 of the variable-width segment 2 as well as the braking rubber 5 and other components have an arcuate shape of 72° divided circumferentially into five equal parts. The braking rubber 5 can also be a ring-shaped endless belt rather than a segment shape.

Watertightness can be increased by applying a seal material in advance over the internal surfaces of the concavity 407 of the variable-width segment 2 and the top surface as seen in FIG. 6 of the convex plate 302. The braking rubber 5 fixed to the internal plate 402 also fulfills a sealing function due to the adhesive 5'.

Figure 10:
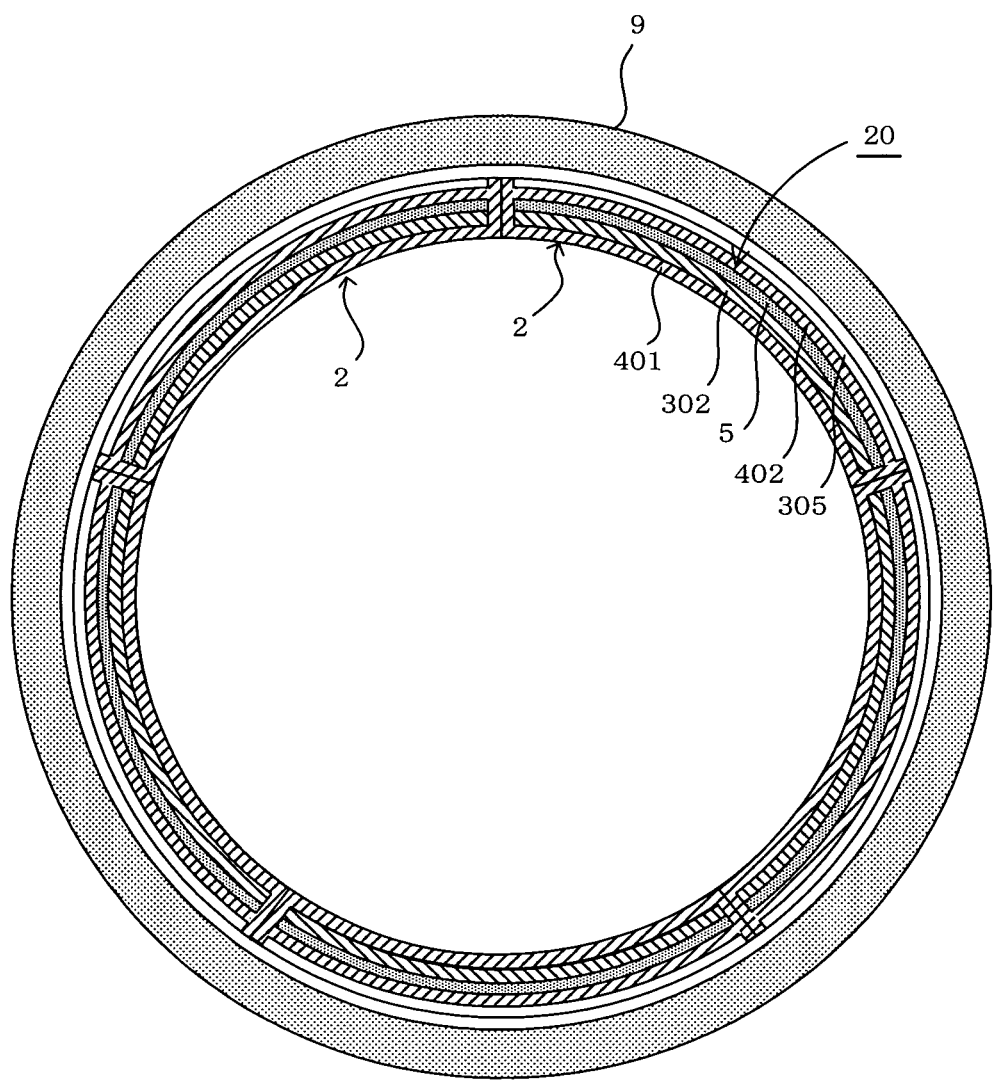
FIG. 10 is a cross-sectional view along the line A-A in FIG. 9.

The linking of variable-width segments 2 in the circumferential direction is accomplished in the same manner as the linking of segments 1 in the circumferential direction; i.e., in the manner as shown in FIG. 2. In other words, two variable-width segments 2 are linked in the circumferential direction by joining the end plates 306, 406 together, passing bolts through the holes 306a, 406a (FIG. 6d) formed in the end plates 306, 406, and fastening the two end plates of the two segments 2 together with bolts and nuts. Thus, variable-width segments are linked sequentially in the circumferential direction, and a pipe unit 20 composed of variable-width segments 2 is assembled (FIG. 10).

Figure 8:
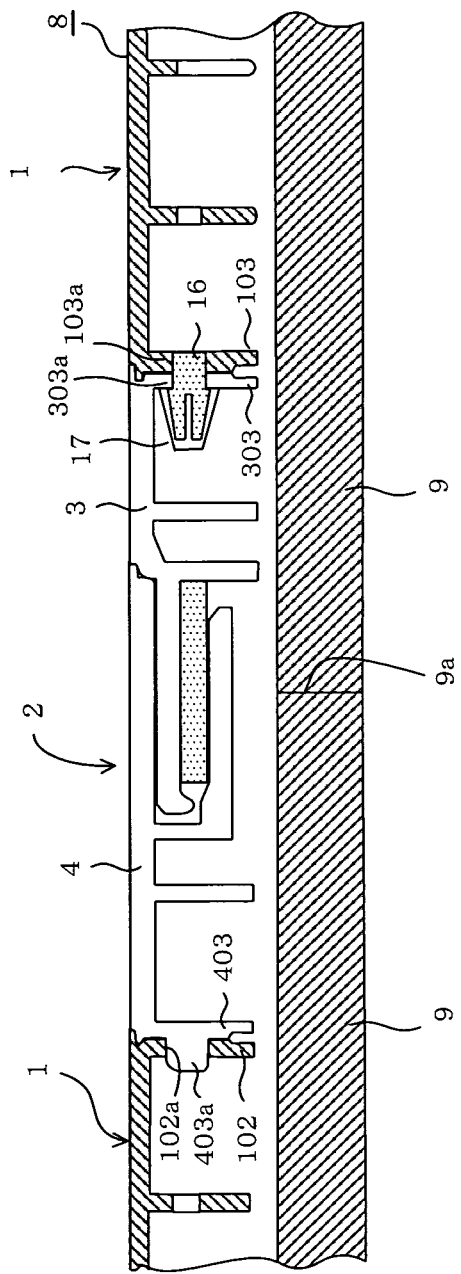
FIG. 8 is a cross-sectional view showing the arrangement and linking structure in the pipe length direction of a variable-width segment in a rehabilitating pipe inside an existing pipe.
Figure 9:
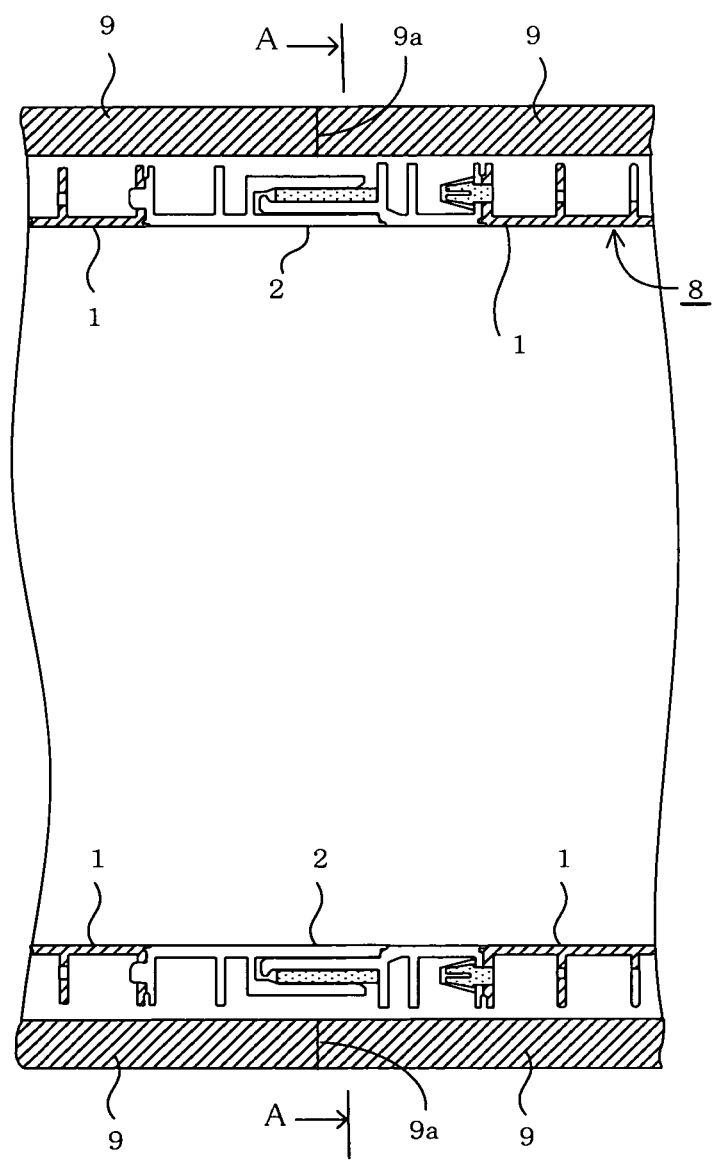
FIG. 9 is a cross-sectional view showing the arrangement of a variable-width segment in a rehabilitating pipe inside an existing pipe.

FIGS. 8 and 9 show a state in which fixed-width segments 1 are linked in the pipe length direction via the variable-width segment 2. In FIG. 8, the variable-width segment 2 and a fixed-width segment 1 on the right side thereof are linked together by fixing a male linking tool 16 into the hole 103a in the side plate 103 of the fixed-width segment 1, passing the male linking tool 16 through the hole 303a in the side plate 303 of the variable-width segment 2, and snap-fitting the male linking tool 16 into a female linking tool 17 fixed in the side plate 303 of the variable-width segment 2. The variable-width segment 2 and a fixed-width segment 1 on the left side thereof are linked together by press-fitting the protuberance 403a of the variable-width segment 2 into the hole 102a of the side plate 102 of the fixed-width segment 1. Though not shown in the drawing, nuts 12 such as those shown in FIGS. 4 and 5 may also be fixed to the variable-width segment 2, and the variable-width segment 2 and fixed-width segment 1 on the left side may be linked together by screw members 11 threaded with the nuts 12.

Thus, the variable-width segment 2 can be linked between the two fixed-width segments 1, 1. The segments 1, 2 are linked in the pipe length direction to assemble the rehabilitating pipe 8 so that the pipe units 20 composed of variable-width segments 2 are positioned in portions facing the seams 9a of the existing pipe 9, and the pipe units 10 composed of fixed-width segments 1 are positioned in the other portions, as shown in FIGS. 8 through 10. After the rehabilitating pipe 8 is finished being assembled, mortar or another filler 8' that begins as a liquid and cures over time is filled in the gap between the external periphery of the rehabilitating pipe 8 and the internal periphery of the existing pipe 9, as was described in relation to FIG. 18. The curing of the filler that has been filled in causes the rehabilitating pipe 8 to be integrated with the existing pipe 9 via the filler, thus constructing a strong, rehabilitated composite pipe.

Since the pipe units 20 composed of variable-width segments 2 are disposed in portions facing the seams 9a of the existing pipe 9, the performance of the composite pipe can be improved as described hereinafter.

Figure 11:
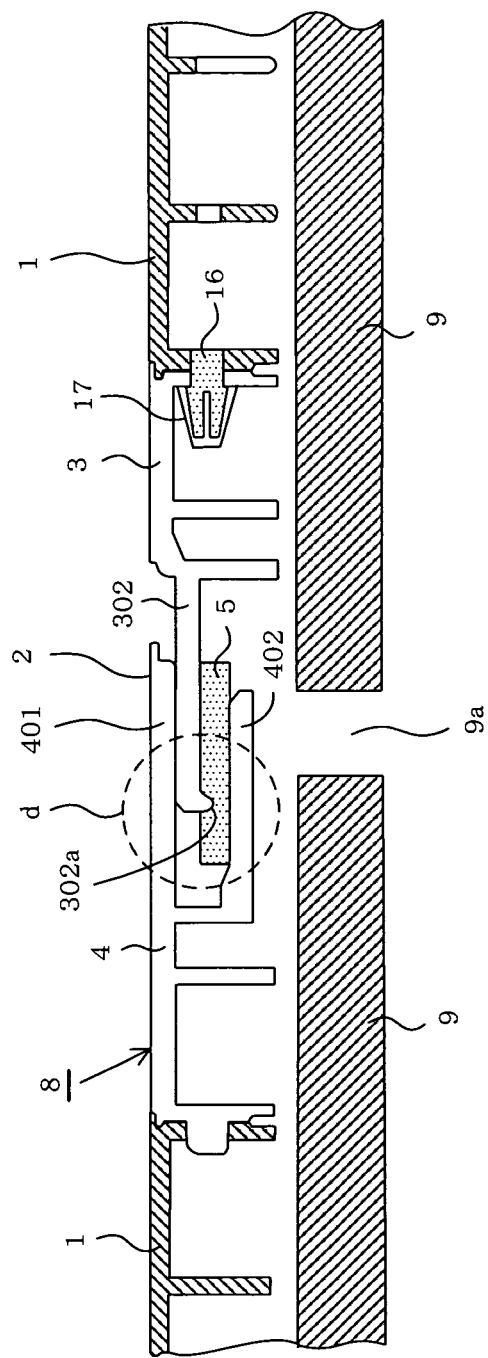
FIG. 11 is a cross-sectional view showing the state of a variable-width segment when the seams of an existing pipe have separated due to an earthquake.
Figure 12B:
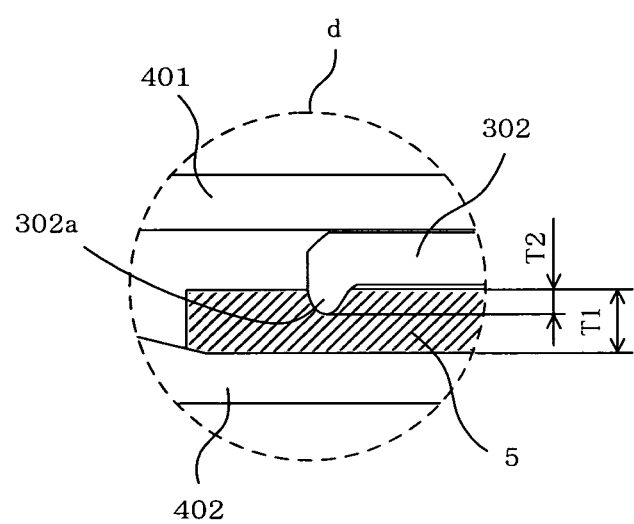
FIG. 12b is an enlarged view of area d in FIG. 11.

In the state shown in FIG. 8, a large amount of tension acts externally on the existing pipe 9 due to an earthquake or the like, and the seams 9a of the existing pipe 9 separate as shown in FIG. 11. Tension causing the segment halves 3, 4 to separate also acts on the variable-width segments 2 integrated via the filler (not shown) with the existing pipe 9. When this tension reaches a predetermined value or greater, the segment halves 3, 4 also separate as shown in FIG. 11, at which time the ridge 302a of the convex plate 302 digs into the braking rubber 5 at a depth T2 about ⅓ of the thickness T1 of the braking rubber 5, elastically deforming the braking rubber 5 as shown in FIG. 12b. The ridge 302a of the convex plate 302 digging into the braking rubber 5 brakes the segment halves 3, 4 from pulling apart. However, if the tension is greater than this braking force, the segment halves 3, 4 move relative to each other by a distance corresponding to the amount by which the seams 9a have separated, and the pipe length of the pipe unit 20 is elongated.

Even if the segment halves 3, 4 move relative to each other in the direction in which they would separate, the rehabilitating pipe 8 remains contiguous as long as the ridge 302a of the convex plate 302 digs into the braking rubber 5, and even if the seams 9a of the existing pipe 9 separate, liquefied sand or the like can be prevented from flowing into the rehabilitating pipe 8 from these portions 9a, thus improving the earthquake resistance of the pipe.

FIGS. 13 and 14 show an embodiment in which variable-width segments 2 are disposed in the curved locations of an existing pipe so as to assemble a curved rehabilitating pipe.

Pipe units 20 composed of variable-width segments 2 are linked between pipe units 10 composed of three fixed-width segments 1 in accordance with the curvature of the existing pipe-in order to assemble a curved rehabilitating pipe 8 as shown in FIG. 13.

In FIG. 13, the dimension of each pipe unit 10 in the pipe length direction, i.e., the width of each fixed-width segment 1 in the pipe length direction is denoted by D (FIG. 3), and the width in the pipe length direction of each variable-width segment 2 shown in FIG. 6c is also D (=D'). The width D of the variable-width segment 2 in the pipe length direction can be varied by spreading the segment halves 3, 4 relative to each other in the form of a fan. For example, when the segment halves 3, 4 of the variable-width segment 2 are relatively spread in the pipe length direction from the state shown in FIG. 14b to the state in FIG. 14a, the ridge 302a of the convex plate 302 moves by an amount α in the pipe length direction, and the width in the pipe length direction of the variable-width segment 2 in this spread portion becomes D+α. This also causes the ridge 401a of the internal surface plate 401 and the recess 301b of the internal surface plate 301 to be angled and widened by an amount θ1.

This spread amount (α) of the segment halves 3, 4 of the variable-width segments 2 can be adjusted at the circumferential position of each segment. Therefore, the widths of the variable-width segments 2 are continuously varied as shown in FIG. 13 so that the spread amount increases progressively from one side to the other along the circumferential direction of the rehabilitating pipe 8 (from the bottom to the top in FIG. 13). Specifically, the widths of the variable-width segments 2 in the pipe length direction are continuously varied so as to be at a minimum in the internal periphery of the curved portions (no spread or offset in FIG. 14b) and a maximum spread (α) in the external periphery of the curved portions (the top position as seen in the diametral direction in FIG. 14a). By continuously varying the segment width in this manner, the pipe units 20 can be curved at an angle θ1, and the rehabilitating pipe 8 can be curved at an angle θ1.

Even if the angle θ1 of curvature in one pipe unit 20 is small, the angle of curvature of the entire rehabilitating pipe 8 can be increased by linking pipe units 20 at a plurality of locations. The variable-width segment 2 used in the present embodiment is preferably one having a small circumferential length, i.e., one having a length resulting from dividing the rehabilitating pipe 8 circumferentially into numerous equal parts (for example, eight or more equal parts). This is to ensure that the amount of spread described above can be reasonably increased continuously in the variable-width segments 2 of the pipe units 20.

Even if the amount of spread is varied as described above, the variable-width segments 2 can be linked in the circumferential direction by the method described above, i.e., by using bolts and nuts, because the end plates 306, 406 of variable-width segments 2 adjacent in the circumferential direction are parallel and of the same size. As for linking in the pipe length direction, variable-width segments can be linked to each other by fitting protuberances 403a of side plates 403 into holes 303a of adjacent side plates 303, and variable-width segments 2 and fixed-width segments 1 can be linked together in the manner shown in FIG. 8.

Though not shown in the drawings, also in this embodiment, the gap between the internal periphery of the existing pipe and the external periphery of the rehabilitating pipe 8 is filled with a filler after the rehabilitating pipe 8 is assembled inside the existing pipe. Thus, the existing pipe and rehabilitating pipe are integrated, forming a composite pipe in the same manner as is described above.

According to the present embodiment, a curved rehabilitating pipe 8 can be assembled merely by linking pipe units 20 composed of variable-width segments 2 at portions which will be curved and adjusting the widths of the variable-width segments 2 of the pipe units 20 as described above. Therefore, a curved rehabilitating pipe can be assembled in a simple manner in a short amount of time without the need for special machining of the segments at a work site.

Since the variable-width segments 2 expand and contract in the width direction as in the embodiment in FIGS. 6 through 11, the curved rehabilitating pipe is prevented from rupturing in the portions of the variable-width segments 2 even if an external force acts from the exterior due to an earthquake or the like.

In the case that the rehabilitating pipe does not require earthquake resistance, the braking rubber 5 can be omitted as shown in FIGS. 15a through 15d.

In FIGS. 15a through 15d, components identical to those in FIGS. 6a through 6d are denoted by the same numerical symbols and are not described in detail. A convex plate 302' of the segment half 3 corresponds to the convex plate 302 in FIGS. 6a through 6d, and the ridge 302a' of the convex plate 302' formed at the distal end is longer in the diametral direction in comparison with FIGS. 6a through 6d. An internal plate 402' of the segment half 4 corresponds to the internal plate 402 in FIGS. 6a through 6d, but unlike FIGS. 6a through 6d, there is no inclined surface and a level surface 402a' is formed.

Figure 15A:
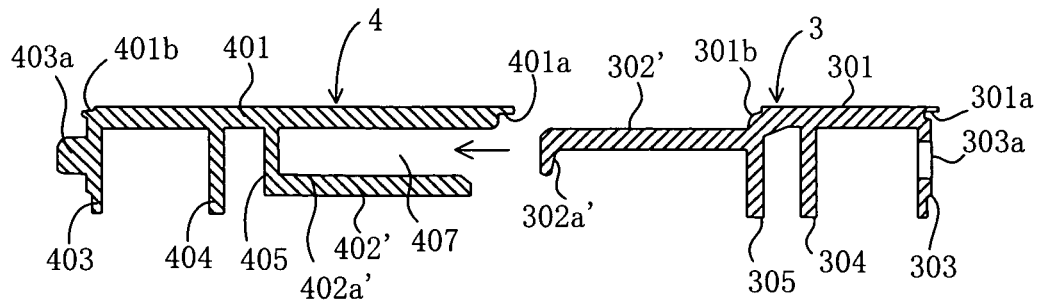
FIGS. 15a through c are cross-sectional views showing the structure and assembly of another embodiment of a variable-width segment.
Figure 15B:
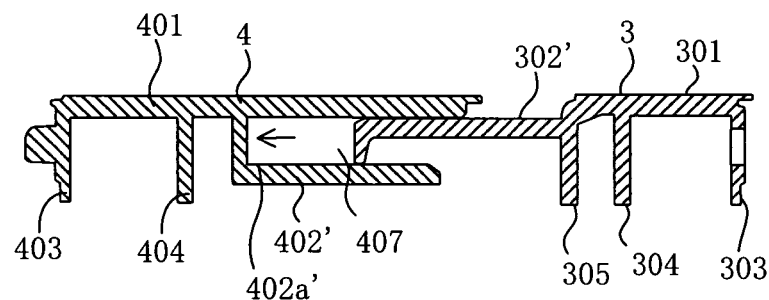
Figure 15C:
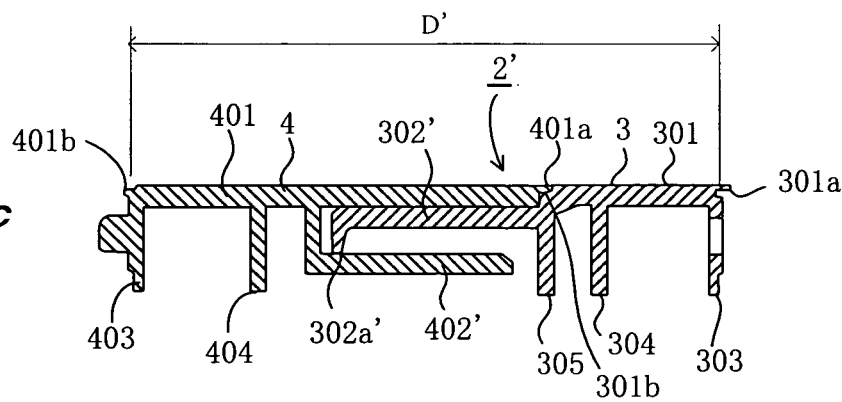
Figure 15D:
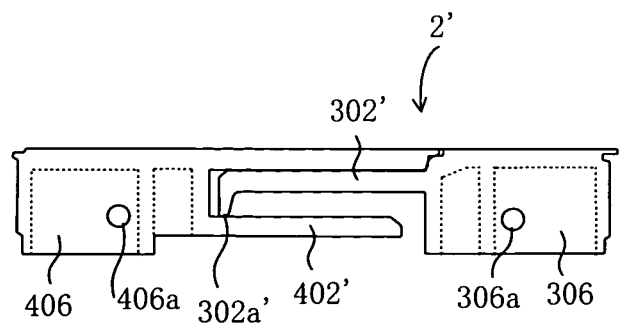
FIG. 15d is an end surface view showing the end surface of the variable-width segment.

The ridge 302a' of the convex plate 302' has a diametral length such that the ridge 302a' can be inserted with room to spare into the concavity 407 of the segment half 4. The convex plate 302' of the segment half 3 is fitted into the concavity 407 of the segment half 4 as shown in FIGS. 15a and 15b, and a variable-width segment 2' having no rubber stop is formed as shown in FIG. 15c.

Such variable-width segments 2' are also linked in both the circumferential direction and pipe length direction, as are the variable-width segments 2 shown in FIGS. 6a through 6d, and are used in the assembly of a curved rehabilitating pipe by the same method as was described in connection with FIG. 13.

The variable-width segments are integrated and fixed in place by the filler (mortar or the like) filled in between the existing pipe and the rehabilitating pipe. Therefore, the segment halves 3, 4 do not necessarily need to be fitted and linked together as shown in FIGS. 15a through 15d. Segment halves can also be superposed so as to constitute a variable-width segment as shown in FIGS. 16a through 16d.

In FIGS. 16a through 16d, a segment half 50 is comprised of an internal surface plate 501 corresponding to the internal surface plate 301 in FIGS. 15a through 15d, a convex plate 502 corresponding to the convex plate 302', a side plate 503 corresponding to the side plate 303, internal plates 504, 505 corresponding to the internal plates 304, 305, an end plate 506 corresponding to the end plate 306, and the like. The plates 501 through 506 are all integrally molded using the same plastic material as the segment 1. The convex plate 502 extends parallel to the internal surface plate 501 at a different height therefrom, and the side plate 503, internal plates 504, 505, and end plate 506 extend perpendicular to the internal surface plate 501.

A ridge 501a and a ledge 501b are formed on one and the other side of the internal surface plate 501, and a ridge 502a is formed on the side of the convex plate 502 facing a segment half 60. A hole 503a is formed in the side plate 503.

The segment half 60 is composed of an internal surface plate 601 corresponding to the internal surface plate 401, a side plate 603 corresponding to the side plate 403, internal plates 604, 605 corresponding to the internal plates 404, 405, an end plate 606 corresponding to the end plate 406, and other components. The plates 601 through 606 are all integrally molded using the same plastic material as the segment 1. The side plate 603, the internal plates 604, 605, and the end plate 606 extend perpendicular to the internal surface plate 601. A recess 601a for fitting with the ridge 501a of the segment half 50 is formed in the internal surface plate 601 on the side opposite the segment half 50, and a concavity 601b through which the ridge 502a of the convex plate 502 slides is formed in the circumferential direction on the bottom surface of the internal surface plate 601. Formed in the side plate 603 is a protuberance 603a for fitting with the holes 102a, 103a in the side plates 102, 103 of the segment 1, or with the hole 503a in the segment half 50. Holes 506a, 606a for linking segments in the circumferential direction are formed in the end plates 506, 606.

Figure 16A:
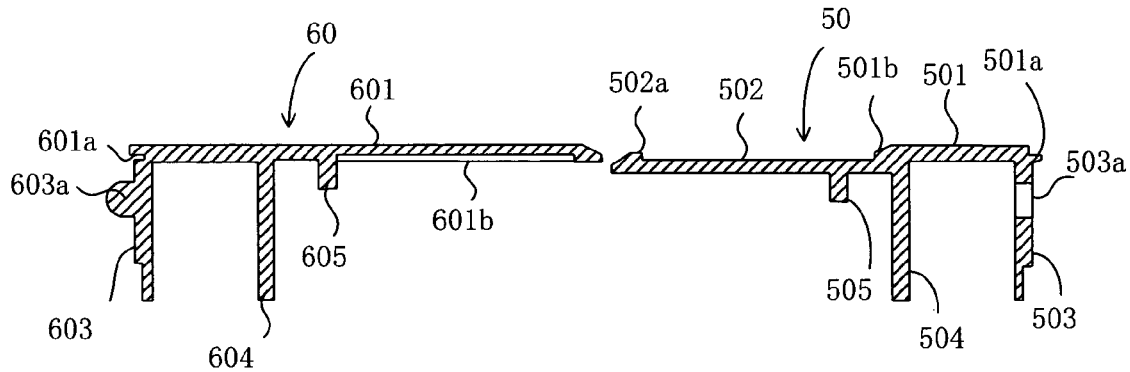
FIGS. 16a through 16c are cross-sectional views showing the structure and assembly of still another embodiment of a variable-width segment.
Figure 16B:
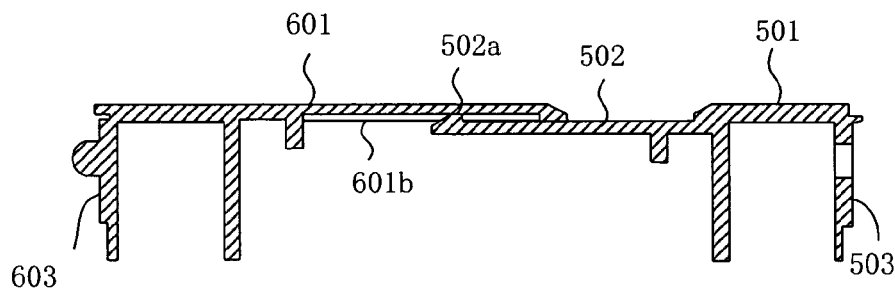
Figure 16C:
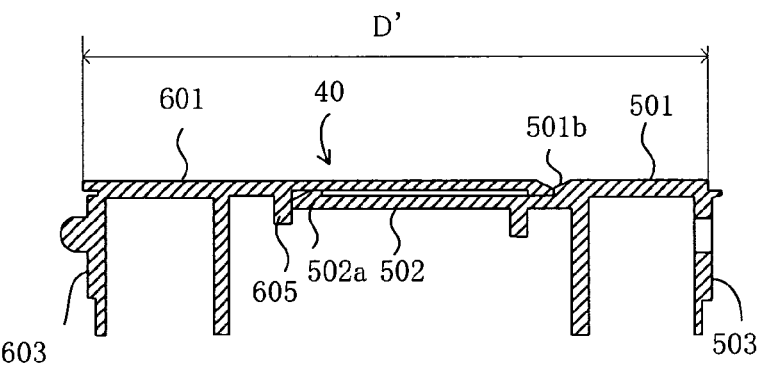
Figure 16D:
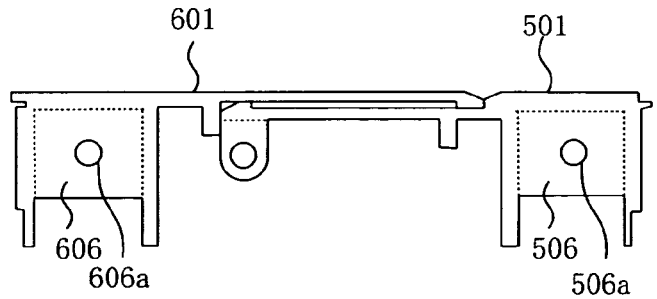
FIG. 16d is an end surface view showing the end surface of the variable-width segment.

The segment halves 50, 60 configured in this manner are moved so that the convex plate 502 of the segment half 50 and the internal surface plate 601 of the segment half 60 are made to overlap by sliding the ridge 502a of the convex plate 502 through the concavity 601b of the segment half 60, as shown in FIGS. 16a and 16b. The segment halves 50, 60 are moved relative to each other until reaching the state in FIG. 16c in which the distal end of the internal surface plate 601 comes in contact with the ledge 501b of the internal surface plate 501 and the ridge 502a of the convex plate 502 comes in contact with the internal plate 605. Thus, a variable-width segment 40 is formed having a width of D' in the pipe length direction. At this time, the internal surface plate 501 of the segment half 50 and the internal surface plate 601 of the segment half 60 are coplanar.

Variable-width segments 40 can also be linked in the circumferential direction and pipe length direction, similar to the variable-width segments 2, 2', and the widths in the pipe length direction can be adjusted at the circumferential position of each segment. Therefore, a pipe unit 41 composed of variable-width segments 40 can be assembled by the same method as is shown in FIG. 13, and the widths of the variable-width segments 40 can be continuously increased progressively from one side to the other along the circumferential direction of the rehabilitating pipe 8. Thus, the widths of the variable-width segments 40 can be continuously varied from D to D+α, and the rehabilitating pipe 8 can be curved at an angle θ1, as shown in FIG. 17.

Since the segment halves 50, 60 are merely superposed together, there is a danger of them moving in the diametral direction and separating. Therefore, after the positions of the segments are adjusted in the width direction, the segment halves 50, 60 are preferably temporarily bonded or temporarily joined in a superposed state. When the existing pipe and rehabilitating pipe are integrated by the filler filled in between the two, the segment halves 50, 60 can no longer move, and accordingly there is no danger of the segment halves moving in the diametral direction.

The same effects can be achieved with the variable-width segment 40 as with the variable-width segment 2', and the advantage of the variable-width segment 40 is that the segment structure can be made simpler than with the variable-width segment 2'.

What is claimed is:

1. A rehabilitating pipe segment for assembling a rehabilitating pipe inside an existing pipe, the rehabilitating pipe having a smaller outside diameter than the inside diameter of the existing pipe, the rehabilitating pipe segment comprising: first and second segment halves connectable together to provide for the rehabilitating pipe segment an internal surface plate and two side plates and two end plates surrounding peripheral edges of the internal surface plate, the first and second segment halves being configured to move relative to one another in a width direction of the rehabilitating pipe segment corresponding to a pipe length direction of the rehabilitating pipe so that the first and second segment halves expand and contract to make the width of the rehabilitating pipe segment variable in the width direction.

2. A rehabilitating pipe segment according to claim 1; wherein the width of the rehabilitating pipe segment increases when tension of a predetermined value or greater is applied thereto in the width direction.

3. A rehabilitating pipe segment according to claim 2; wherein the first segment half has a convex plate protruding in the pipe length direction and a braking member; and wherein the second segment half has a concavity for receiving the convex plate and the braking member with the convex plate and the braking member fitted into the concavity so as to link the first and second segment halves together, the first and second segment halves being caused to move relative to each other in the pipe length direction against the braking force of the braking member so as to increase the width of the rehabilitating pipe segment in the pipe length direction when tension of the predetermined value or greater is applied thereto in the pipe length direction.

4. A rehabilitating pipe segment according to claim 2; wherein:
the first segment half has a first internal surface plate forming a portion of the internal surface plate of the rehabilitating pipe segment, a convex plate extending parallel to the first internal surface plate, and a first side plate extending perpendicular to the first internal surface plate and forming one of the side plates of the rehabilitating pipe segment;
the second segment half has a second internal surface plate and an internal plate, the second internal surface plate forming another portion of the internal surface plate of the rehabilitating pipe segment and extending perpendicular to the other of the side plates of the rehabilitating pipe segment, and the internal plate forming the concavity and extending parallel to the second internal surface plate; and
the convex plate of the first segment half and the braking member for braking the first and second segment halves from separating are fitted into the concavity of the second segment half so as to link the first and second segment halves together.

5. A rehabilitating pipe segment according to claim 1; wherein the first segment half has a convex plate protruding in the pipe length direction; and wherein the second segment half has a concavity for receiving the convex plate so as to link the first and second segment halves together.

6. A rehabilitating pipe segment according to claim 1; wherein:
the first segment half has a first internal surface plate forming a portion of the internal surface plate of the rehabilitating pipe segment, a convex plate extending parallel to and at a different height from the first internal surface plate, and a first side plate extending perpendicular to the first internal surface plate and forming one of the side plates of the rehabilitating pipe segment;
the second segment half has a second internal surface plate forming another portion of the internal surface plate of the rehabilitating pipe segment, and a second side plate extending perpendicular to the second internal surface plate and forming the other of the side plates of the rehabilitating pipe segment; and
the convex plate of the first segment half and the second internal surface plate of the second segment half are superposed together so that the first and second segment halves can move relative to each other.

7. A rehabilitating pipe segment, according to claim 1; wherein each of the first and second segment halves has portions of the internal surface plate, side plates and end plates of the rehabilitating pipe segment; and wherein during expansion of the first and second pipe segment halves in the width direction, the corresponding portions of the internal surface plate and end plates separate from one another in the pipe length direction.

8. A rehabilitating pipe segment according to claim 3; wherein the braking member has a length corresponding to an entire circumferential length of the first segment half.

9. A rehabilitating pipe segment according to claim 3; wherein the braking member is fitted in the concavity of the second segment half so that the braking member and the first segment half do not move relative one another and the first and second segment halves remain integrally coupled to one another via the braking member until tension of the predetermined value or greater is applied to the rehabilitating pipe segment in the pipe length direction.

10. A rehabilitating pipe formed of a plurality of rehabilitating pipe segments according to claim 1.

11. A composite pipe comprising:
a rehabilitating pipe formed of a plurality of rehabilitating pipe segments according to claim 1, the rehabilitating pipe being assembled inside of an existing pipe with a gap therebetween that is filled with a filler material to integrate the rehabilitating pipe with the existing pipe.

12. A rehabilitating pipe comprising: a plurality of ring-shaped pipe units each formed of a plurality of rehabilitating pipe segments according to claim 1.

* * * * *